(12) United States Patent
Brookler et al.

(10) Patent No.: US 6,879,976 B1
(45) Date of Patent: Apr. 12, 2005

(54) DATA INDEXING USING BIT VECTORS

(75) Inventors: David E. Brookler, Los Angeles, CA (US); Ariel Hazi, Los Angeles, CA (US); Dave L. Sullivan, North Hollywood, CA (US); Dominic Tham, Los Angeles, CA (US); Philip A. Tinari, Beverly Hills, CA (US); Paul N. Weinberg, Los Angeles, CA (US)

(73) Assignee: AZI, Inc., Los Angeles, CA (US)

( * ) Notice: Subject to any disclaimer, the term of this patent is extended or adjusted under 35 U.S.C. 154(b) by 480 days.

(21) Appl. No.: 09/643,316

(22) Filed: Aug. 21, 2000

Related U.S. Application Data

(60) Provisional application No. 60/149,855, filed on Aug. 19, 1999.

(51) Int. Cl.[7] .............................. G06F 17/30; G06F 7/00
(52) U.S. Cl. ......................................................... 707/3
(58) Field of Search ........................................ 707/1–5

(56) References Cited

U.S. PATENT DOCUMENTS

| | | | | |
|---|---|---|---|---|
| 4,817,036 A | * | 3/1989 | Millett et al. ................... | 707/1 |
| 5,649,181 A | * | 7/1997 | French et al. ................... | 707/3 |
| 5,706,495 A | * | 1/1998 | Chadha et al. .................. | 707/2 |
| 5,761,652 A | * | 6/1998 | Wu et al. ........................ | 707/2 |
| 5,799,184 A | * | 8/1998 | Fulton et al. ................... | 707/2 |
| 5,848,408 A | * | 12/1998 | Jakobsson et al. ............. | 707/3 |
| 5,852,821 A | * | 12/1998 | Chen et al. ..................... | 707/2 |
| 5,884,307 A | * | 3/1999 | Depledge et al. .............. | 707/7 |
| 5,899,988 A | * | 5/1999 | Depledge et al. .............. | 707/3 |
| 5,903,888 A | * | 5/1999 | Cohen et al. ................... | 707/3 |
| 5,907,297 A | * | 5/1999 | Cohen et al. ................... | 341/95 |
| 5,924,088 A | * | 7/1999 | Jakobsson et al. ............. | 707/2 |
| 5,963,935 A | * | 10/1999 | Ozbutun et al. ................ | 707/3 |
| 6,067,540 A | * | 5/2000 | Ozbutun et al. ................ | 707/3 |
| 6,070,164 A | * | 5/2000 | Vagnozzi ..................... | 707/100 |
| 6,081,800 A | * | 6/2000 | Ozbutun et al. ................ | 707/3 |
| 6,141,656 A | * | 10/2000 | Ozbutun et al. ................ | 707/3 |
| 6,154,741 A | * | 11/2000 | Feldman ......................... | 707/9 |
| 6,285,994 B1 | * | 9/2001 | Bui et al. ....................... | 707/2 |
| 6,405,187 B1 | * | 6/2002 | Egan et al. ..................... | 707/2 |
| 6,658,405 B1 | * | 12/2003 | Ozbutun ........................ | 707/3 |
| 6,804,664 B1 | * | 10/2004 | Hartman et al. ............... | 707/3 |

OTHER PUBLICATIONS

O'Neil, P. and G. Graefe "Multi–Table Joins Through Bit-mapped Join Indices", ACM SIGMOD Record, vol. 24, No. 3, pp. 8–11, Sep. 1995.*

Gupta, H., V. Harinarayan, A. Rajaraman and J.D. Ullman "Index Selection for OLAP", Proceedings of the 13th International Conference on Data Engineering, pp. 208–219, Apr. 7–11, 1997.*

O'Neil, P. and D. Quass "Improved Query Performance with Variant Indexes", Proceedings of the ACM SIGMOD Conference o Management of Data, pp. 38–49, Jun. 1997.*

Wu, M–C, and A.P. Buchmann "Encoded Bitmap Indexing for Data Warehouses", Proceedings of the 14th International Conference on Data Engineering (ICDE), pp. 220–230, Feb. 1998.*

(Continued)

*Primary Examiner*—Luke S Wassum
(74) *Attorney, Agent, or Firm*—Dalina Law Group P.C.

(57) ABSTRACT

The present invention provides for indexing of occurrences of a value in at least one data record using a bit vector wherein a bit vector is associated with the value and a bit of the bit vector representation is associated with the at least one data record, a determination is made whether the value exists in the at least one data record, a bit value is assigned to the bit in the bit vector representation based on the outcome of the determination. Further, operations may be performed on multiple bit vectors indexing data records and values used in the data records to determine the existence of combinations and associations between the corresponding values and the indexed data records.

2 Claims, 11 Drawing Sheets

OTHER PUBLICATIONS

Chan, C-Y and Y.E. Ioannidis "Bitmap Index Design and Evaluation", Proceedings of the ACM SIGMOD Conference on Management of Data, pp. 355–366, Jun. 1–4, 1998.*

Datta, A. and I. Viguier "The DataIndex: A Structure for Smaller, Faster Data Warehouses", The DATA BASE for Advances in Information Systems, vol. 29, No. 4, pp. 33–44, Fall 1998.*

Wikiepedia "Logical Conjunction", definition, downloaded from en.wikipedia.org on Apr. 6, 2004.*

Wikipedia "Bitwise Operation", definition, downloaded from en.wikipedia.org on Apr. 6, 2004.*

Schildt, H. "C: The Complete Reference, Second Edition", Berkeley:McGraw–Hill, pp. 47–54, 1990.*

Babb, E. "Implementing a Relational Database by Means of Specialized Hardware", ACM Transactions on Database Systems, vol. 4, No. 1, pp. 1–29, Mar. 1979.*

Schneider, D.A. and D.J. DeWitt "A Performance Evaluation of Four Parallel Join Algorithms in a Shared–Nothing Multiprocess Environment", Proceedings of the ACM SIGMOD International Conference on Management of Data, pp. 110–121, Jun. 1989.*

Chaudhuri, S. and D. Umeshwar "An Overview of Data Warehousing and OLAP Technology", AMC SIGMOD Record, vol. 26, No. 1, Mar. 1997.*

Perrizo, W., Z. Zhang and S. Krebsbach "A Query Processing Method for Data Warehouses Which Contain Multimedia", Proceedings of the ACM Symposium on Applied Computing, pp. 323–327, Apr. 1997.*

* cited by examiner

Products Table 300

| Product ID | Description | Manufacturer | Category |
|---|---|---|---|
| 1 | ACME Printer | 1 | 1 |
| 2 | ACME Computer | 1 | 2 |
| 3 | Apex Computer | 2 | 2 |
| 4 | Best Printer | 3 | 1 |
| 5 | Apex Monitor | 2 | 3 |

310, 311, 312, 313, 314

Manufacturers Bit Vector Index 303

| Manufacturer ID | Bit Vector |
|---|---|
| 1 | 11000 |
| 2 | 00101 |
| 3 | 00010 |

330, 331, 332

Categories Bit Vector Index 304

| Category ID | Bit Vector |
|---|---|
| 1 | 10010 |
| 2 | 01100 |
| 3 | 00001 |

340, 341, 342

Manufacturers Table 301

| Manufacturer ID | Manufacturer |
|---|---|
| 1 | ACME |
| 2 | Apex |
| 3 | Best |

320, 321, 322

Categories Table 302

| Category ID | Category |
|---|---|
| 1 | Printer |
| 2 | Computer |
| 3 | Monitor |

Initial 900
Value List          ACME                    Apex                          Best        901 Resulting
ACME                                                                                  Value List
Apex                                                      931                         932 ACME
Best                         930              AND                                     Apex
                              AND              941                      AND
                              941                                       941
Computer BV    1  1  0  0  0     0  0  1  0  1     0  0  0  1  0
               0  1  0  0  0     0  1  1  0  0     0  1  1  0  0
               ─────────────     ─────────────     ─────────────
               0  1  0  0  0  951 0  0  1  0  0 952 0  0  0  1  0  953

Fig. 9A

Initial 900
Value List          Printer                  Computer                    Monitor      901 Resulting
Printers                                                                              Value List
Computers                    940              AND          941                        942 Printers
Monitors                      AND             930                    AND              Computers
                              930                                    930              930
Printer        1  0  0  1  0     0  1  1  0  0     0  0  0  1  0
ACME BV        1  1  0  0  0     1  1  0  0  0     1  1  0  0  0
               ─────────────     ─────────────     ─────────────
               1  0  0  0  0  954 0  1  0  0  0  955 0  0  0  0  0  956

Fig. 9B

CategoryID-to-ManufacturerID Bit Vector Index 1000

| Category ID | Bit Vector | | |
|---|---|---|---|
| 1 | 1 | 0 (1014) | 1 |
| 2 | 1 | 1 (1012) | 0 |
| 3 | 0 | 1 | 0 |

ManufacturerID-to-CategoryID Bit Vector Index 1001

| Manufacturer ID | Bit Vector | | |
|---|---|---|---|
| 1 | 1 | 1 | 0 |
| 2 | 0 (1015) | 1 (1013) | 1 |
| 3 | 1 | 0 | 0 |

Category ID = 1    1  0  1  1  0    1340

Cagegory ID = 2    0  1  0  0  0    1341

Fig. 10

DATA INDEXING USING BIT VECTORS

This application claims the benefit of U.S. Provisional Application No. 60/149,855, filed Aug. 19, 1999.

BACKGROUND OF THE INVENTION

1. Field of the Invention

The present invention relates to indexing data and, more particularly, to a method and apparatus wherein bit vector indexing is used to index data such as record data in a database.

2. Description of the Related Art

A DBMS (Database Management System) is used to manage data and is comprised of computer-executable code that may be used to define structure of data and to access data within the defined structure. One example of a DBMS is a relational DBMS, or RDBMS. An RDBMS manages tables that make up a relational database as well as the data contained in the tables. In an RDBMS, data is organized in rows (or records) and columns (or fields) of the tables, and two or more tables may be related based on like data values. The intersection of a row and column in a table is referred to as a cell and contains the data value for a particular field of a particular record.

A DML (data manipulation language) such as SQL (Structured Query Language) is typically used to store, retrieve and modify data in a table. A schema defines the structure of a database, i.e., each table and the fields within a record of a table. A schema is itself considered data that is stored in one or more tables. Therefore, like other data in a database, a DML may be used to store, retrieve and modify the data in the database as well as the structure of a database.

There are performance issues with respect to data access in a DBMS particularly when the database is very large. A typical RDBMS is optimized for certain types of query access. However, performance degrades when the database is very large, when a query returns a large set of records, when row selection criteria apply across multiple fields and tables, or when interactively browsing large sets of query results. Value limiting on a lookup table reduces the set of lookup values by eliminating from the set of all possible lookup values those values that do not correspond to any records in the primary table. Another problem is that value limiting cannot efficiently and quickly be done using the standard mechanisms of an RDBMS.

An RDBMS uses indexes to assist in performing queries and quickly locate records in the database. Indexes store one or more field (or column) values from each record as a unique key for the record. Indexes do an adequate job of speeding up the query process even on large databases when the row selection criteria include constraints on only a single field and when the query results do not need to be browsed interactively. In particular, an RDBMS can quickly search for and retrieve an individual record from among even millions of records based on the value of an indexed field.

Unfortunately, however, there are a number of shortcomings to searching using conventional forms of indexing.

For example, if the number of records in the database is very large, the index itself can become large as well, so that as a practical matter it will be stored on disk rather than in memory, moderately increasing the time necessary to search for records.

Further, if the row selection criteria includes constraints for multiple fields, the speedup only applies to each field individually. The problem of then reconciling the multiple sets of query results, one for each constraint, into a single set of query results for all the constraints, requires complex algorithms and heuristics that can dramatically increase the time necessary to execute the query. In fact, the time required grows geometrically with the number of records in the individual result sets, which means that query constraints that return very large sets of records reduce system performance.

A further disadvantage of conventional indexing relates to situations in which a user wishes to interactively browse query results which results in performance degradation. Most relational database management systems support interactive browsing using cursors and temporary files, which require that the entire set of query results first be written to disk before browsing, a very slow operation compared to memory access. Moreover, the set of query results must be accessed and written to disk in its entirety even if only a small subset of the records will ever be brought into view. Again, if the set of query results is very large, the operation of writing them to disk can take a long time.

Also, if a user chooses to build up a query interactively and iteratively by adding one constraint at a time and viewing intermediate query results along the way, the entire query process needs to be repeated from scratch as each additional constraint is added to the query, each time incurring all of the overhead of each of the steps of reading the index, applying multiple row selection criteria, reconciling query results, and writing them to disk.

A final problem arises when attempting to perform value limiting. Value limiting allows the system to present the user with lists of values for search selections that always correspond to records in the primary table, preventing the user from making search selections that lead to no records found. Unfortunately, a typical RDBMS can only accomplish this process through complex, multi-table joins (i.e., a join combines information from two tables by performing a lookup on every record of the primary table) that cannot usually be done quickly enough to provide an acceptable response time in an interactive environment. A lookup uses a pair of matching columns from two tables, taking the value of the column for a single record in the first primary table to "look up" additional information in a single corresponding record in the second lookup table. As a result, value limiting is impractical when performing interactive and iterative searches because the value limiting would have to be done across multiple lookup tables again and again.

Thus, it would be beneficial to have a mechanism to more efficiently index data in data records such as those stored in a database.

SUMMARY OF THE INVENTION

The present invention addresses the foregoing problems and provides for an indexing scheme for indexing data in data records using bit vectors.

In one aspect of the invention, indexing of occurrences of a value in at least one data record using a bit vector representation is provided wherein the bit vector representation is associated with the value and a bit of the bit vector representation is associated with each of the at least one data record, a determination is made whether the value exists in the at least one data record, a bit value is assigned to the bit in the bit vector representation based on the outcome of the determination.

Indexing using BVs (bit vectors) provide several advantages over conventional indexing approaches. Since, a BV uses one bit per record in the primary table instead of a minimum of eight bytes per record for an index, a bit vector is substantially smaller than a conventional index. This results in faster processing and less memory usage, since it is not likely to need to be stored on disk, and if it is, requires that less data be accessed on the disk for a particular operation. Further, it is possible to encode a BV, using any of the well known compression schemes, to further reduce the amount of storage they require.

Further, instead of complex algorithms reconciling individual sets of query results to combine the multiple constraints, logical operations may be used. Unlike the geometric time required to reconcile individual result sets in the conventional searching approaches, the time grows linearly with the number of records in the primary table.

The set of records that satisfy a query correspond to the bit vector that results from bit-wise operations (e.g., "ORs" and "ANDs"). There is no need to create a temporary file of query results and the records themselves do not need to be accessed in advance. In an interactive environment, a particular record need only be accessed when it is browsed into view, if ever.

In addition, BVs reduce the repeated overhead when performing interactive, iterative queries. Intermediate resulting bit vectors can be stored for each lookup field during the course of an iterative query. Additional constraints can then be applied to them rather than reapplying all of the constraints from scratch using the original BVs of the BVIs (Bit Vector Indexes).

Further, operations may be performed on multiple bit vectors to determine the existence of combinations and associations between the corresponding values used in the indexed data records. BVIs are perfectly suited for value limiting across multiple lookup tables and completely eliminate the need to perform complex multi-table joins.

In another aspect of the invention, combinations of values used in at least one data record are identified by creating a first bit vector representation for a first value, the first bit vector representation identifying use of the first value in the at least one data record, creating a second bit vector representation for a second value, the second bit vector representation identifying use of the second value in the at least one data record, and performing a bit-level operation on the first and second bit vector representations.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

FIG. 3 provides an example of a table and the use of BVIs to index data contained in the table according to the present invention.

FIGS. 9A and 9B provide an example of value-limiting processing performed according to the present invention.

FIG. 10 provides an example of Category-Manufacturer and Manufacturer-Category BVIs according to the present invention.

DETAILED DESCRIPTION OF THE PREFERRED EMBODIMENTS

Figure 1:
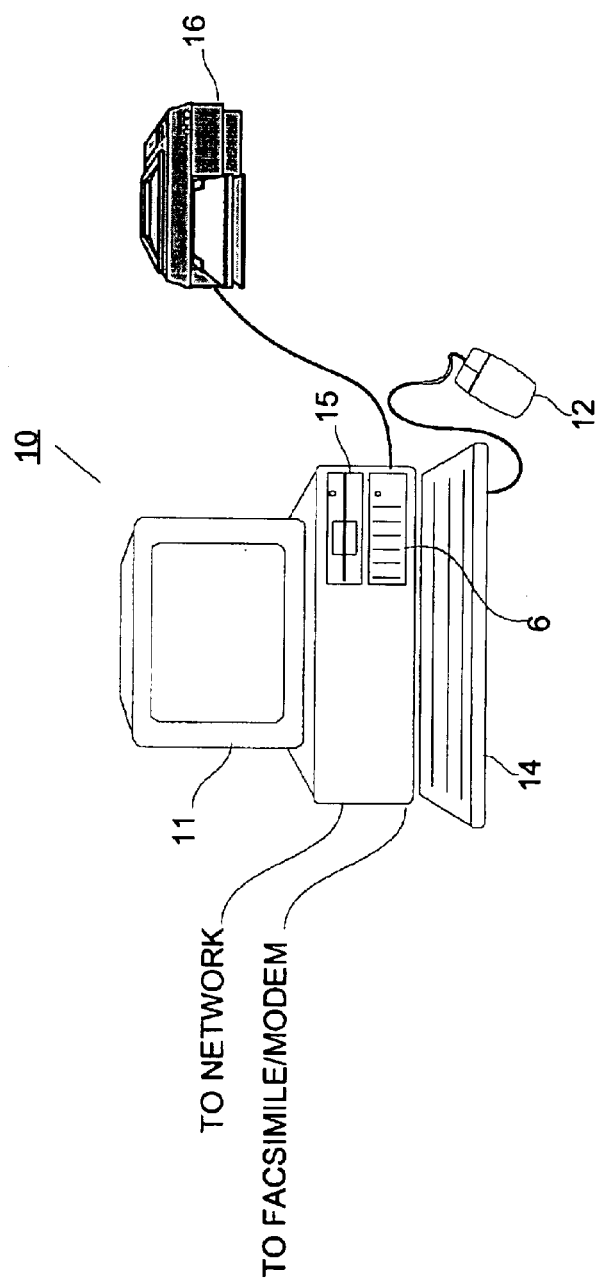
FIG. 1 is an outward view of a hardware environment embodying the present invention.

FIG. 1 is an outward view of representative computing hardware embodying the present invention. Shown in FIG. 1 are computer 10 executing an operating system, display monitor 11 for displaying text and images to a user, keyboard 14 for entering text and commands into computer 10, and mouse 12 for manipulating and for selecting objects displayed on display monitor 11, or for output to an output device such as printer 16. Also included with computer 10 are fixed disk drive 6, in which are stored application programs, such as a DBMS and other applications, data files, and device drivers for controlling peripheral devices attached to computer 10, floppy disk drive 15 for use in reading data from and writing data to floppy disks inserted therein. Data and/or applications may also be accessed from a CD-ROM via a CD-ROM drive (not shown) or over a network to which computer 10 may be connected (network connection not shown).

Figure 2:
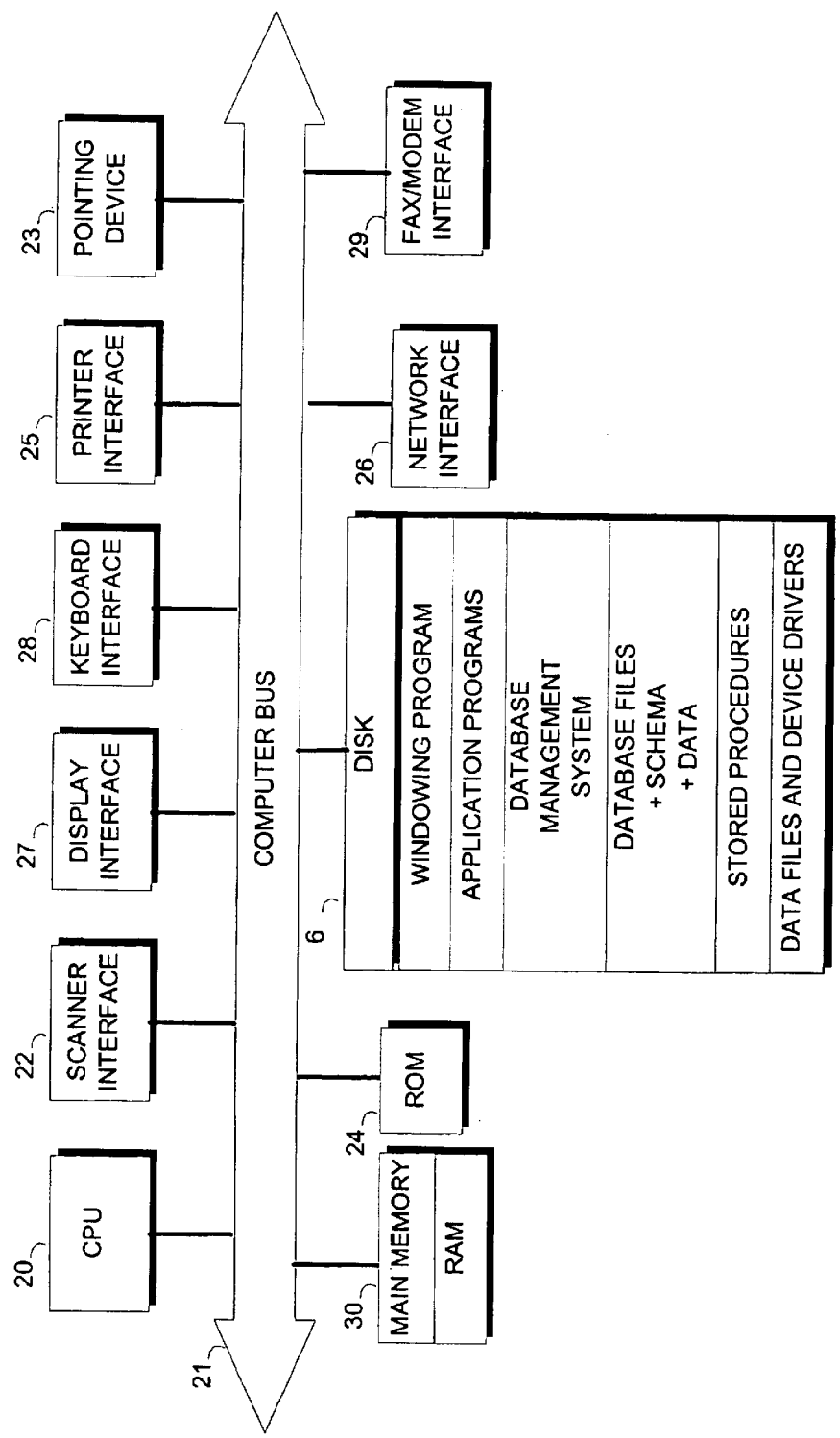
FIG. 2 is a block diagram of the internal architecture of a typical computer for use in conjunction with the present invention.

FIG. 2 is a block diagram of the internal architecture of computer 10. Shown in FIG. 2 are CPU 20, which may be any microprocessor including, but not limited to, a Pentium-type microprocessor, interfaced to computer bus 21. Also interfaced to computer bus 21 are printer interface 25, to allow computer 10 to communicate with printer 16, modem interface 29 to enable communications between computer 10 and a modem, display interface 27 for interfacing with display monitor 11, keyboard interface 28 for interfacing with keyboard 14, mouse interface 23 for interfacing with mouse 12, and network interface 26 for connecting to a network (e.g., Internet, intranet, local area network, etc.).

Read only memory (ROM) 24 stores invariant computer-executable process steps for basic system functions such as basic I/O, start up, or reception of keystrokes from keyboard 14.

Main random access memory (RAM) 30 provides CPU 20 with memory storage which can be accessed quickly. In this regard, computer-executable process steps of a DBMS or other application are transferred from disk 6 over computer bus 21 to RAM 32 and executed therefrom by CPU 20.

Also shown in FIG. 2 is disk 6 which, as described above, includes a windowing operating system, a DBMS which includes data stored therein as well as schema and data stored in one or more tables defined in the schema. Further, disk 6 may be used to store executable-code (e.g., stored procedures) comprising steps described herein indexing data using bit vector representations. Disk 6 further includes data files and device drivers as shown.

The present invention uses a BVI (Bit vector Index) to augment the standard indexing scheme of a typical RDBMS. A BVI is a collection of BV representations that together comprise an index for a particular column in a table of a database. One example of a BV representation is a bit vector (BV) comprising a sequence of Boolean values, each stored as a single bit. The column in the indexed table stores a reference to a value in a set of enumerated values such as those values found in a lookup table. A lookup mechanism uses a pair of matching columns from two tables, taking the value of the column for a single record in the first table to "look up" additional information in a single corresponding record in the second (lookup) table.

The present invention creates a BVI for each matching column pair that relates a lookup field in the indexed table to a set of values in a lookup table. BVI indexing of the present invention may be used in place of or as a supplement to other forms of indexing.

BVIs and BVs have a number of advantages. Since, a BV uses one bit per record in the indexed table instead of a minimum of eight bytes per record for an index, a bit vector is substantially smaller than a conventional index. This results in faster processing and less memory usage, since a BVI is not likely to need to be stored on disk, and if it is, requires that less data be accessed on the disk for a particular operation. Further, it is possible to encode a BV to generate another BV representation that optimizes the space need for a BV. Further, it is possible to compress a BV representation (optimized or not), using any of the well known compression schemes, to further reduce the amount of storage required for a BVI.

Further, instead of complex algorithms reconciling individual sets of query results to combine the multiple constraints, logical operations may be used. Unlike the geometric time required to reconcile individual result sets in the conventional searching approaches, the time grows linearly with the number of records in the primary table.

In the present invention, a set of records that satisfy a query can be represented as a BV that is the result of bit-wise operations (e.g., "ORs" and "ANDs"). There is no need to create a temporary file of query results and the records themselves do not need to be accessed in advance. In an interactive environment, a particular record need only be accessed when it is browsed into view, if ever.

In addition, BVIs reduce the repeated overhead when performing interactive, iterative queries. Intermediate resulting bit vectors can be stored for each lookup field during the course of an iterative query. Additional constraints can then be applied to them rather than reapplying all of the constraints from scratch using the original BVs of the BVIs.

BVIs are perfectly suited for value limiting across multiple lookup tables and completely eliminate the need to perform complex multi-table joins.

FIG. 3 provides an example of a table and the use of BVIs to index data contained in the table according to the present invention. The particular tables depicted in FIG. 3 are by way of example only, and it should be apparent that the present invention is not limited to this example.

Products table 300 contains four fields: product ID, description, manufacturer and category fields. Each of records 310 through 314 contain information associated with a particular manufacturer and category. The manufacturer and category fields are lookup fields such that the value in each cell stores a reference (or identifier, ID) to a value in a lookup table.

Lookup tables 301 and 302 associate the reference made in records 310 through 314 to an actual value. Table 301 contains values for manufacturers in records 320–322 while table 302 contains category values in records 350–352. Referring to table 301, for example, an ID value of "2" corresponds to the manufacturer, "APEX" as held in record 321. In products table 300, records 312 and 314 have a value of "2" in the manufacturer field. In a DBMS, the value in the manufacturer field of record 312, for example, may be used to lookup the name of the manufacturer associated with a lookup value of "2". Similarly, a value in the category fields of records 310 through 314 may be used to identify a corresponding category name stored in table 302.

BVIs 303 and 304 contain BVs associated with the manufacturer table 301 and category table 302 (respectively).

A BVI may comprise multiple BVs. Preferably, a BVI such as BVIs 303 and 304 are array structures with each entry containing a BV and the indexed value being a pointer into the array. Further, a BVI is preferably a unidimensional array. However, a BVI may be multidimensional arrays as well. BVIs 303 and 304 of FIG. 3 are depicted as two dimensional arrays that includes the indexed value to further illustrate the functionality of the present invention.

Each BV of a BVI identifies the records in the indexed table that correspond to one particular value in the lookup table. A bit is set in a particular position in the BV that corresponds to a given value, if the corresponding record in the indexed table has that value. The collection of BVs for all of the values of the matching column in the lookup table comprises the BVI for that matching column pair.

Thus, for example, records 330 through 332 of BVIs 303 contain BVs that provide an index of records 310 through 314 and the manufacturers identified in the records. Similarly, records 340 through 342 contain BVs for indexing records 310 through 314 by category.

Figure 4:
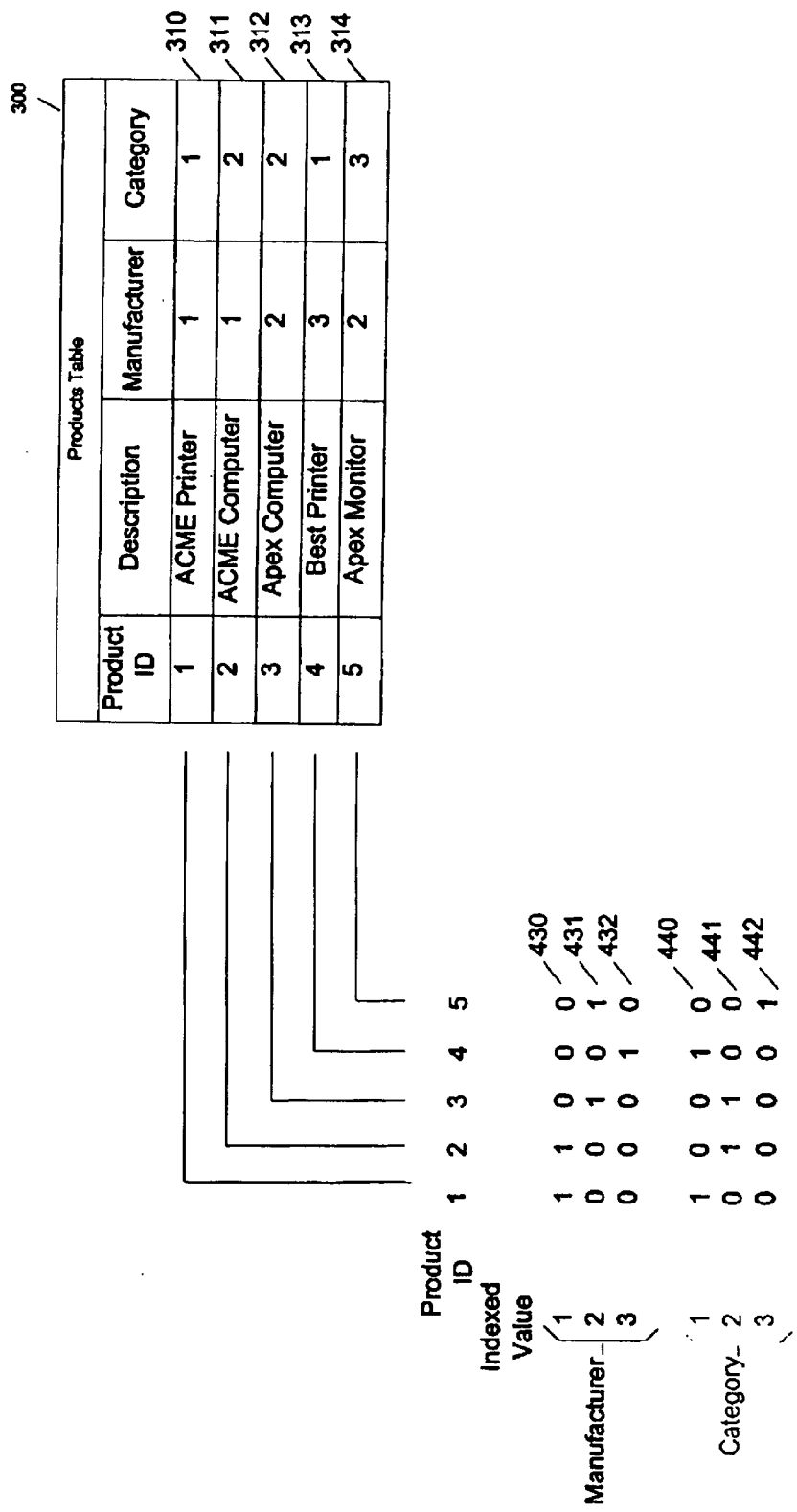
FIG. 4 further illustrates the BVs (bit vectors) depicted in FIG. 3.

FIG. 4 further illustrates the BVs depicted in FIG. 3. BVs 430 through 432 provide an index of manufacturers while BVs 440 through 442 index categories. To further illustrate, BV 430 contains five bits each corresponding to a record 310 through 314 of table 300. The leftmost bit corresponds to record 310, the next to record 311, the third to record 312, the fourth to record 313 and the rightmost bit to record 314.

In this example, a value of "1" in a manufacturer's BV indicates that the corresponding record in table 300 references the manufacturer that corresponds to the BV in its manufacturer field.

For example, referring to BV 430, which indexes a manufacturer value of "ACME", bits one and two are "on" indicating that the corresponding records 310 and 311 of table 300 reference the "ACME" manufacturer. Similarly, in BV 441, which indexes the "Computer" category, the second and third bits correspond to records 311 and 312 (respectively) and are set to indicate that these records reference the "Computer" category.

A BV contains one bit per record of the indexed table rather than a minimum of eight bytes per record for a conventional index. Thus, a BV is substantially smaller than a corresponding index. A BVI can, therefore, be processed faster and requires less memory. Further, since it requires less storage space, a BVI is not as likely to need to be stored on disk as a conventional index, but if it is, the reduced size of a BVI results in less data being accessed on the disk for a particular operation.

In addition, various encoding techniques may be used to further reduce the size of a BVI and the BVs contained therein. It is possible to encode sparse BVs to further reduce the amount of storage they require. Various encoding schemes that are used include enumeration, run-length encoding, truncation of leading and trailing zeros, and LZW compression, as well as additional compression over the entire BVI.

Compression is especially useful where there are contiguous portions of a BV with like values (i.e., "0"s or "1"s).

However, even in the case that a BV contains randomly distributed 1's or 0's, it may be possible to compact the BV by storing bits up to the last bit set.

The present invention provides various encoding mechanisms to optimize storage based on the nature of the BVs. A flag may be associated with each BVI to identify the encoding scheme used for a BVI.

One such BVI structure may be used where there are contiguous portions of a BV, the BV may be stored as an ordered list of either set (e.g., values of "1") or unset bits (e.g., values of "0"). That is, instead of storing a BV as a series of "1"s and "0"s, bit position information is stored. For example, where the first ninety-nine bits are "0" and the hundredth bit is a "1", the first entry in the BV is the value "100". Conversely, where the BV contains fewer "0"s than "1"s, for example, the ordered list may indicate the position of the "0"s in the BV. Such encoding is especially useful where the number of bits set (or unset) is less than 1 in each "n" bits where "n" is the word size (or number of bits used to store a number). For example, such encoding is well suited for BVs where the number of bits set (or unset) is 1 bit in 32 bits for 4-byte numbers, 1 in 16 for 2-byte numbers, 1 in 8 for 1-byte numbers, etc.

A BV may also be stored as ordered start and end pairs of set (or unset) bits. That is, a run of set (or unset) bits are stored as start and stop positions within a BV in which the run begins and ends (respectively). Such encoding is especially useful when the average run, or region size, is greater than twice the word size used to store a number, or a region size of 64 for 4-byte numbers, 32 for 2-byte numbers, etc.

Compression can also be applied to any of the above encoding approaches. However, there are tradeoffs between speed and storage. Compression can act to decrease speed, but is useful where it improves storage. The determination may be made based on the available computer system resources.

As with standard indexes, there is a mapping between a bit of the BV and a record in the indexed table. Preferably, the pointer into a BV is a field in the indexed table (e.g., a record ID field such as the product ID field in table 300) whose value identifies the corresponding bit position in the BV. Alternatively, a mapping mechanism may be used to translate between a record ID and a position in a BV.

A BVI must be synchronized with the fields that it indexes. For an existing table, the values contained in the indexed fields are used to generate a BVI. Thereafter, the BVI is updated whenever a value in the indexed field is modified.

Figure 5:
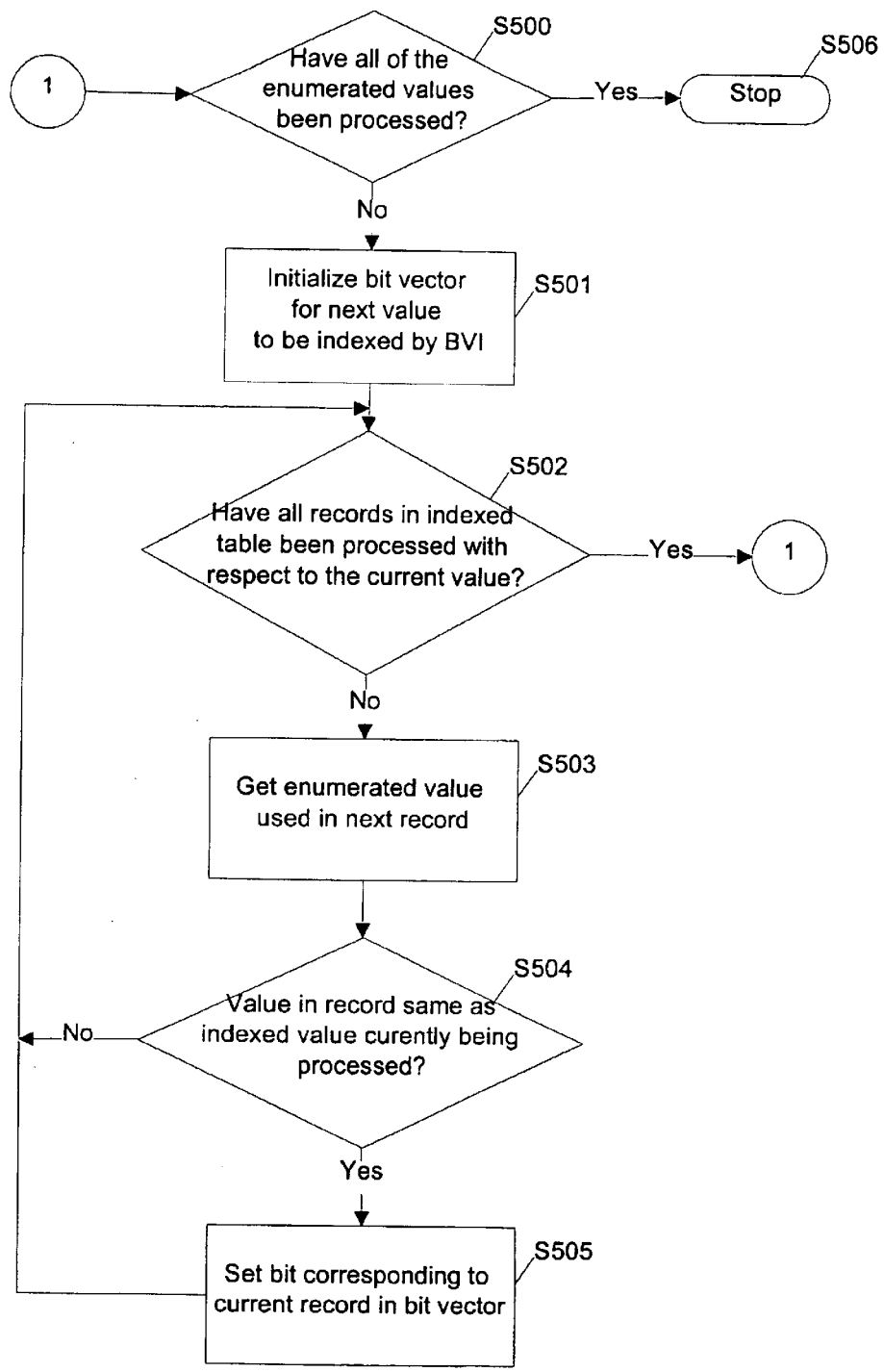
FIG. 5 provides a diagram of process steps to create a BVIs and BVs according to the present invention.

FIG. 5 provides a diagram of process steps to create a BVI and BVs contained therein according to the present invention. The process steps of FIG. 5 are performed for each value in a lookup table (e.g., values 1 through 3 in table 301 or 302) to generate a BVI where a BV in the BVI corresponds to a value in the lookup table.

At step S500, a determination is made whether all of the enumerated values in the lookup table have been processed. If so, processing ends at step 506. If not, processing continues at step S501 to generate a BV for the next enumerated value.

At step S501, the BV for the next enumerated value is initialized. At step S502, a determination is made whether all of the records in the indexed table have been processed for the current enumerated value. If so, processing continues at step S500 to process any remaining enumerated values. If not, processing continues at step S503 to get the enumerated value used in the next record in the indexed table (e.g., one of records 310 through 314 of products table 300).

At step S504, a determination is made whether the value used in the record is the same as the indexed value currently being processed. If not, processing continues at step S502 to process any remaining records in the indexed table. If so, processing continues at step S505 to set the bit, that corresponds to the current record, in the BV for the indexed value currently being processed.

Processing continues at step S502 to process any remaining records in the indexed table.

Searching lookup fields based on lookup values is dramatically faster using a BVI than a traditional index. To identify the set of records in the indexed table that correspond to a particular value in the lookup table, the BV for that value is extracted from the BVI for the lookup table. The bits that are set in the BV immediately identify the set of records. Using this approach, the time required to identify the set of records having a particular value in a lookup field grows linearly rather than geometrically (as in conventional approaches) with the number of records, as well as linearly rather than exponentially (as in conventional approaches) with the number of tables.

In addition, multiple constraints on a single lookup field may be handled using logical operations on BVs. Thus, for example, selecting records based on multiple lookup table values is accomplished using an "OR" operation. Such an operation may be used to select records from products table 300 where the manufacturer is either "ACME" or "Apex". The BVs that correspond to each of the desired lookup table values are "ORed" together. Any bit that is set in the resulting BV indicates that the corresponding record in the indexed table is included in the result set.

Figure 6:
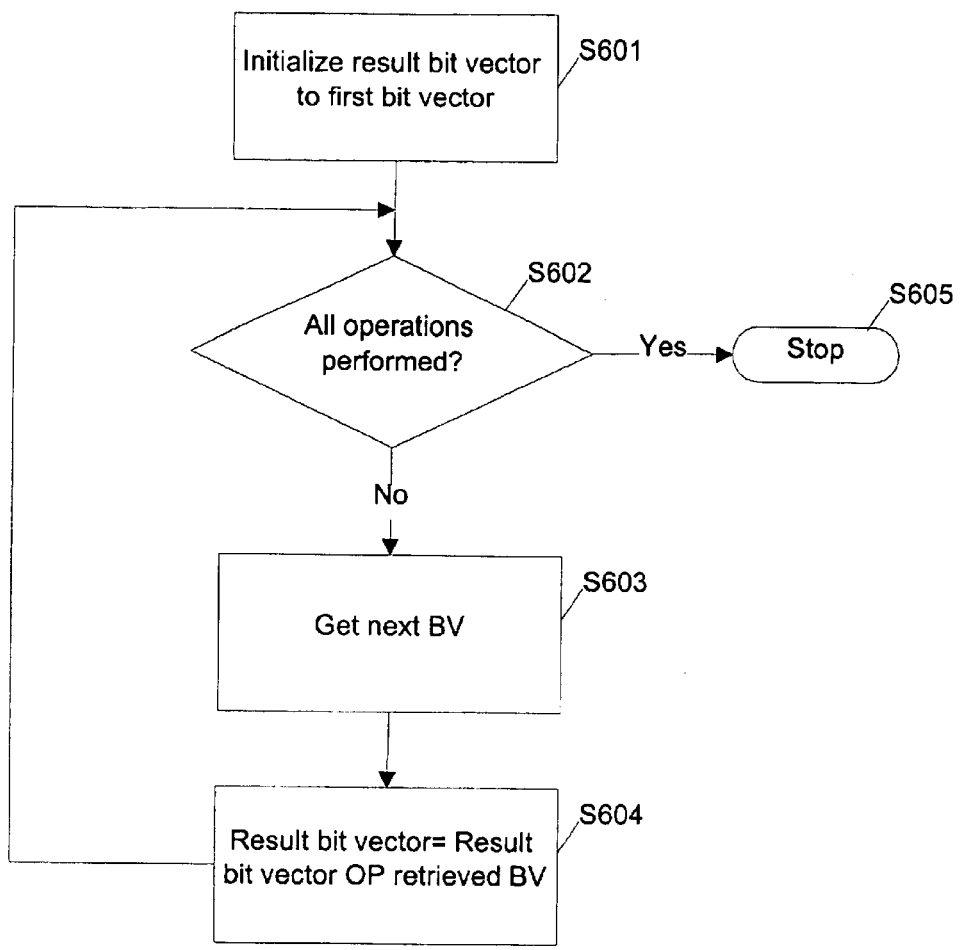
FIG. 6 provides a diagram of process steps to perform a bit-wise operation on BVs according to the present invention.

FIG. 6 provides a diagram of process steps to perform a bit-wise operation on BVs according to the present invention. At step S601, a result BV is initialized to the first BV to be used in the operation. At step S602, a determination is made whether all operations have been performed. If so, processing ends at step S605. If not, processing continues at step S603, to get the next BV. At step S604, the result BV is updated by performing a bit-wise operation (e.g., an "OR" or "AND" operation) on the result BV and the BV retrieved in step S603. Processing then continues at step S602 to process any remaining BVs and or BVIs.

Operations performed on BVs may proceed hierarchically in addition to the linear approach taken in FIG. 6. That is, for example, operations performed on like BVs are performed first using an "OR" bit-wise operation and bit-wise "AND" operations on dissimilar BVs are performed on the result(s). To illustrate, consider a selection criteria that comprises "Printer" or "Monitor" from either "ACME" or "Apex". Since the first two are both categories of products and the latter two are both manufacturers, a bit-wise "OR" operation is performed to generate a BV that satisfies the category criteria, a bit-wise "OR" operation is performed to generate a BV that satisfies the manufacturer criteria, and the two generated BVs are then bit-wise "ANDed".

Figure 7A:
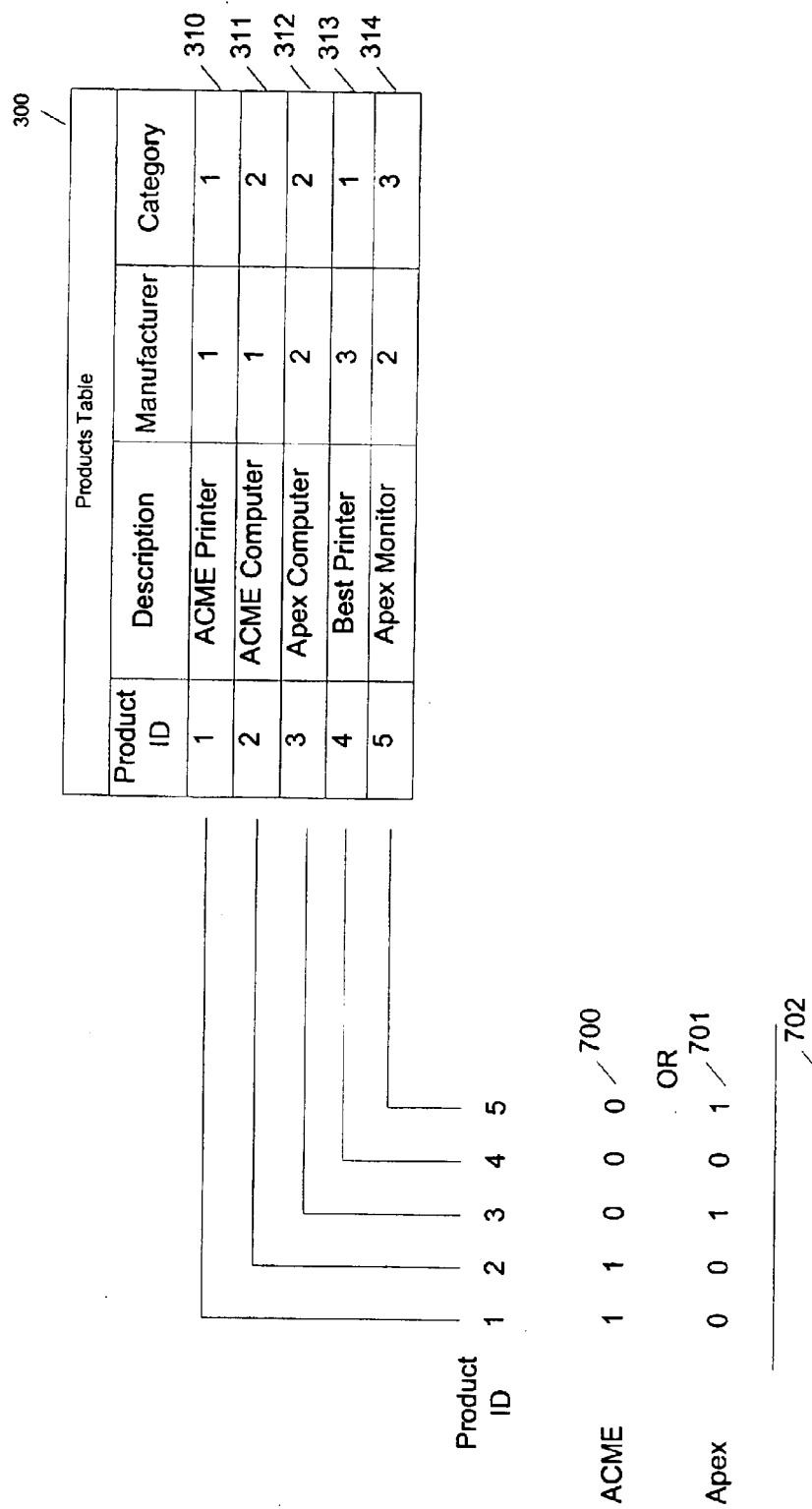
FIGS. 7A and 7B provide an example of bit-wise "OR" and "AND" operations performed on BVs according to the present invention.
Figure 7B:
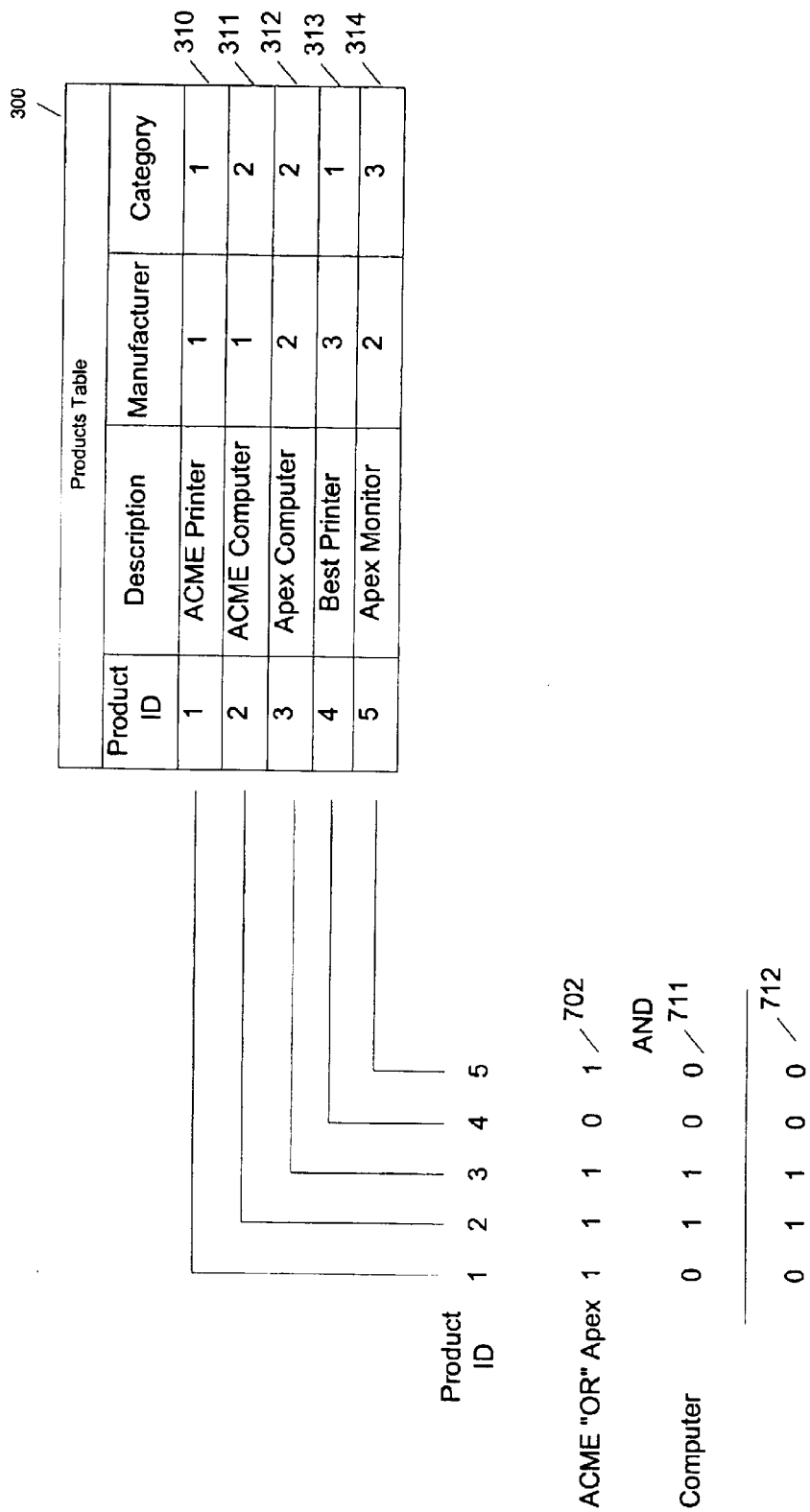

FIGS. 7A and 7B provide an example of bit-wise "OR" and "AND" operations performed on BVs within BVIs according to the present invention.

Referring to FIG. 7A, an "OR" operation is performed on the "ACME" and "Apex" BVs (from records 330 and 331 of table 303) to identify the records in products table 300 where the manufacturer is either "ACME" or "Apex".

BV 700 from record 330 is "ORed" with BV 701 of record 331 to yield BV 702. Since a value of "1" is used to indicate that the corresponding record in the products table 300 contains the lookup table value (i.e., either "ACME" or "Apex"), the presence of a "1" in BV 702 indicates that either "ACME" or "Apex" appears in the corresponding record. That is, records 310, 311, 312, and 314 contain a manufacturer's value of either "ACME" or "Apex".

BVIs also facilitate searching that involve constraints on multiple fields. In a conventional approach, complex algorithms are used, and reconciling individual sets of query results must be performed to combine the multiple constraints. Instead, the present invention contemplates one or more operations on a set of BVIs that is faster and less complex. After the bit vectors for multiple values constraining a single lookup field are first bit-wise "ORed", the resulting BVs for each of the lookup fields are then bit-wise "ANDed". Unlike the geometric time required to reconcile individual result sets, the time grows linearly with the number of records in the indexed table.

For example, a request for a manufacturer equal to either "ACME" or "Apex" and a category of "Computer" may be satisfied using logical bit-wise operations (e.g. "AND" and "OR") on the corresponding manufacturer and category BVIS.

The appropriate manufacturer BVs are bit-wise "ORed" together as illustrated in FIG. 7A. The result, BV 702, is then bit-wise "ANDed" with the BV corresponding to the "Computer" category. Referring to FIG. 7B, BV 702 is bit-wise "ANDed" with BV 711 (from record 341) to yield BV 712. As indicated by BV 712, records 311 and 312 contain the requested "ACME" and "Apex" computer products.

In the above operations, there was no need to store query (e.g., intermediate or final) results in temporary storage (e.g., file or memory). Further, the appropriate records may be found without the need to access the records themselves. The records that correspond to the set values in the result BV values are the appropriate records. Given records must be accessed only when it is necessary to provide the information contained in the record such as when the record is to be displayed in an interactive environment (e.g., browsing environment). Since the time needed to retrieve all of the records to perform the necessary queries as done in the past is eliminated, the setup time needed to generate the interactive display may be reduced. Records are only accessed when they are to be browsed or otherwise viewed in the interactive environment.

It is also possible to store intermediate, result BVs (e.g., BVs 702 and 712) in a case that a constraint is frequently used, for example. It is then possible to apply additional constraints to the stored, intermediate BVs rather than reapplying all of the constraints on the original BVs thereby reducing the overhead. This is especially useful in a case of incremental queries performed interactively (e.g., by a user or users of an interactive system). It can be seen that storage of intermediate results in the form of intermediate BVs requires much less space than storing intermediate results (i.e., tables containing records) that would be necessary when using a conventional approach.

BVB are perfectly suited for value limiting across multiple lookup tables and completely eliminate the need to perform complex multi-table joins.

BVs may also be used to perform value limiting on a particular lookup field. Value limiting is typically used to limit selection to only those values that correspond to records in the indexed table that satisfy any constraints.

Briefly, value limiting is performed using the present invention by ignoring the constraints on a lookup field being value-limited, so that the next incremental query can change the constraints on a particular lookup field based on all the values for which records exist in the indexed table, not just the values already selected based on constraints on the value-limited lookup field.

If one does not already exist, an intermediate BV is generated using the constraints on any other lookup fields.

A logical "AND" operation is then performed on the intermediate BV and each BV in the BVI for the value-limited lookup field. In contrast to a bit-wise "AND" operation, a logical "AND" returns a single value (i.e., either "TRUE" or "FALSE"). Any value for which the result of the logical "AND" is "FALSE" may be eliminated from the value-limited list. Note that it is not always necessary that all the bits in the BV be compared. That is, the comparison can stop as soon as one pair of corresponding bits are found to both be set.

Figure 8:
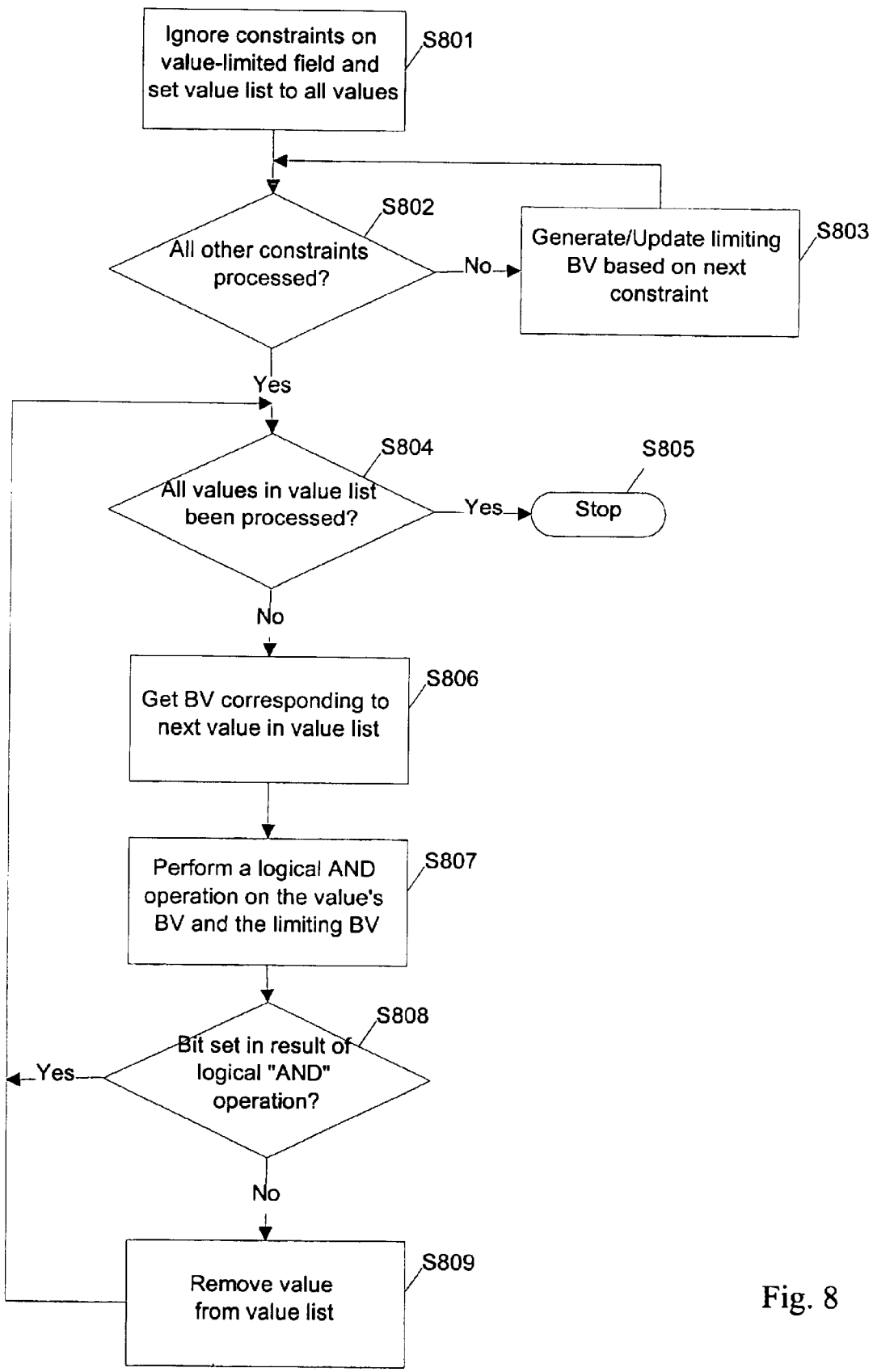
FIG. 8 provides a diagram of process steps to perform value-limiting according to the present invention.

FIG. 8 provides a diagram of process steps to perform value-limiting according to the present invention. Initially, the constraints on the value-limited field are ignored and, at step S801, the set of valid values for the value-limited field are all the values.

At step S802, a determination is made whether constraints on other lookup value fields have been processed. If not, processing continues at step S803 to generate or update a limiting BV using the next constraint. The limiting BV is used to limit the value-limited field by applying it to each of the BVs in the value-limited field's BVI. Step S803 may be performed as discussed above with reference to FIG. 6. Processing continues at step S802 to process any remaining constraints on other lookup value fields.

If it is determined, at step S802, that all other constraints have been processed, processing continues at step 5804 to determine whether all values in the value list initially created in step S801 have been processed. If so, processing ends at step S805. If not, processing continues at step S806, to get the BV that corresponds to the next value in the value list. At step S807, a logical "AND" operation is performed on the value BV and the limiting BV generated in step S803.

At step S808, the result of the "AND" operation performed at step S807 is examined to determine whether is has a value of "TRUE" or "FALSE". If the result is "TRUE", processing continues at step S804 to process any BVs remaining for the value-limited value. If the result is "FALSE", processing continues at step S809 to remove the value that corresponds to the BV retrieved in step S806 from the value list, and processing continues at step S804.

FIGS. 9A and 9B provide an example of value-limiting processing performed according to the present invention. FIG. 9A provides an example of value-limiting manufacturers to those that provide computer products. Initially, a value list 900 is generated that ignores any constraints on manufacturers. That is, value list 900 includes "ACME", "Apex" and "Best".

A result BV is generated which, in the case of the example, is simply the BV for "Computers", or BV 941 (i.e., "01100"). BV 941 is logical "ANDed" with each of BVs 930, 931 and 932 from the manufacturer BVI table 303. BV 930 (for manufacturer ID="1" or "ACME") is logical "ANDed" with BV 941 to yield BV 951. As illustrated by BV 951, the result of a logical "AND" is "TRUE", since both BVs 930 and 941 have the second bit set. Similarly, a logical "AND" between BV 931 (for manufacturer ID="2" or "Apex") and BV 941 results in "TRUE". However, BV 932 (i.e., for manufacturer ID="3" or "Best") logically "ANDed" with BV 941 yields no set bits (as illustrated by BV 953). Therefore, the result of the logical "AND" is "FALSE". As indicated in value list 901, the value limited set of manufacturers is "ACME" (ID="1") and "Apex" (ID="2"). A validation check of the data will reveal that the only manufacturers with computer products are "ACME" and "Apex".

Similarly, FIG. 9B illustrates value-limiting performed on the category lookup field. To find the valid categories for the "ACME" manufacturer, for example, a result BV is generated while ignoring the Category constraints. In this case, this is simply BV 930 (i.e., "11000") from the manufacturers BVI. BV 930 is logical "ANDed" with each of the category BVs 940, 941 and 942. As illustrated by BVs 954, 955 and 956, logical "AND" operations yield a "TRUE" for ID="1" and ID="2", but a "FALSE" for ID="3". Thus, as indicated in value list 901, the valid categories are "Printers" and "Computers".

Like BVIs 303 and 304 that store BVs for an indexed value relative to data records, it is also possible to create value-limiting BVIs that store BVs to identify a correlation between BVIs. Thus, for example, it is possible to create a Category-Manufacturer BVI that includes BVs that correlate each of the categories with each of the manufacturers. Thus, examination of one of the BVs in the Category-Manufacturer BVI identifies which manufacturers sell what product category (or categories). Similarly, it is possible to create a Manufacturer-to-Category BVI to identify which product category (or categories) are offered by a particular manufacturer.

FIG. 10 provides an example of Category-Manufacturer and Manufacturer-Category BVIs according to the present invention. Each BV in BVI 1000 identifies the manufacturers that offer a given product category. A bit in a BV of BVI 1000 correlates a category with a manufacturer. For example, bit 1012 correlates the "Apex" manufacturer with the "Computer" category. Similarly, each BV in BVI 1001 identifies the product categories offered by a given manufacturer. Each bit (e.g., bit 1013) correlates a manufacturer (e.g., "Apex") and a category (e.g., "Computer").

As discussed above, a BV that reflects occurrences of values in an indexed table such as products table 300 is updated to reflect a change made to a record in the indexed table (e.g., products table 300). A change in a BV of a retained value-limiting BVI may also be necessary.

For example, assume that the Category ID in record 312 is changed from "2" to "1". BVs 340 and 341 are updated as well to reflect the change as is illustrated in BVs 1340 and 1341, respectively. The inquiry then becomes whether or not BVIs 1000 and 1001 should also be updated. The third bit of BV 1340 is updated to indicate that an additional record of products table 300 refers to Category ID="1". Similarly, the third bit of BV 1341 is updated to reflect that record 312 in products table 300 refers has been changed to Category ID="1".

The focus of inquiry with respect to value-limiting BVIs 1000 and 1001 is whether or not the intersections of Category ID="2" and Manufacturer ID="2" need to be updated. Bit 1014 of BVI 1000 and bit 1015 of BVI 1001 should reflect the newly-created relationship while bit 1012 of BVI 1000 and 1013 of BVI 1001 of BVI 1001 reflect the relationship severed by the update. Updating these bits is based on whether there are other records in products table 300 that include both a Category ID and a Manufacturer ID equal to "2". Instead of recreating BVIs 1000 and 1001, it is possible to update only those BVs that are effected by the update (i.e., those BVs involving Categories "1" and "2" and Manufacturer "2").

Bits 1014 and 1015 correspond to a combination of Category "1" and Manufacturer "2", and the change to products table 300 created a relationship between these values. If another record contains this relationship, bits 1014 and 1015 are already set. However, bits 1014 and 1015 are unset indicating that there is no prior relationship between these values of Category and Manufacturer. Bits 1014 and 1015 are therefore set to reflect the newly-created relationship.

Bits 1014 and 1015 may simply be set. Alternatively, a logical "AND" may be performed between the updated BV 340 (i.e., BV 1340, "10110") and BV 331 (i.e., "00101"). The result of the logical "AND" reflects the fact that the update created a combination of Manufacturer and Category that did not previously exist. Bits 1014 and 1015 are updated to reflect the new combination.

In contrast to bits 1014 and 1015 that involve the relationship created by the update, bits 1012 and 1013 involve the relationship severed by the update. What is not immediately apparent is whether there is another record in products table 300 that contains the same relationship (i.e., Category "2" and Manufacturer "2"). If not, bits 1012 and 1013 need to be reset. If there is another relationship, however, there is no need to update bits 1012 and 1013.

The simple (but inefficient) approach is to simply run through the records to see if any records match. An alternative approach is to first update BVI 304 (i.e., BVs 340 and 341 are updated as BVs 1340 and 1341) to reflect the update to products table 300. Once BVI 304 is updated, BV 1341 (i.e., "01000") from BVI 304 is logical "ANDed" with BV 331 ("00101") of BVI 303 to determine whether any records meet both the Category "2" and Manufacturer "2" criteria after the update. If the result is "TRUE", there is no need to update bits 1012 and 1013. If the result is "FALSE", bits 1012 and 1013 are unset.

In the value-limiting examples discussed above, an "AND" operation is performed to limit one value set by another value set. Value-limiting may be used to limit the value selections made available to a user. Thus, given a particular value for Manufacturer (e.g., "ACME"), value-limiting may be used to identify those Category values that are associated in one or more records of the products table 300. In addition to "AND", it is possible to "OR" BVs to identify existing value combinations or lack thereof.

The present invention performs bit-level operations such as the bit-wise and logical operations described above. It is possible to further optimize these operations by storing the number of bits set in a BV and the position of the first set bit. This provides the ability to start an operation at the first set bit rather than the beginning of a BV. It is also possible to stop after all the set bits have been encountered rather than traversing to the end of a BV. Where such information is known for both BV operands used in an operation, the operation between the BVs may start at the earliest set bit and stop at the last set bit known for the BVs.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method of indexing occurrences of a value in at least one data record using a bit vector comprising:

associating a first bit vector with a first value to be held in a first field;

associating a second bit vector with a second value to be held in said first field;

associating a third bit vector with a third value to be held in a second field;

performing a first logical "AND" operation on said first bit vector with said third bit vector to yield a first result Boolean value wherein said first logical "AND" operation terminates upon achieving a first successful match on a bit by bit basis;

performing a second logical "AND" operation on said second bit vector with said third bit vector to yield a second result Boolean value wherein said second logical "AND" operation terminates upon achieving a second successful match on a bit by bit basis;

storing said first result Boolean value and said second result Boolean value as a value limit correlation wherein said value limit correlation comprises a first index having a first dimension sized to a first number of distinct values held in said first field and a second index having a second dimension sized to a second number of distinct values held in said second field irregardless of a total data record count; and determining if at least one record in a database exists wherein said at least one record comprises both said first value in said first field and said third value in said second field by accessing said value limit correlation and without accessing said database and without accessing said first, said second or said third bit vectors.

2. A method of indexing occurrences of a value in at least one data record using a bit vector comprising:

associating a first bit vector with a first value to be held in a first field;

associating a second bit vector with a second value to be held in said first field;

associating a third bit vector with a third value to be held in a second field;

performing a first logical "AND" operation on said first bit vector with said third bit vector to yield a first result Boolean value wherein said first logical "AND" operation terminates upon achieving a first successful match on a bit by bit basis;

performing a second logical "AND" operation on said second bit vector with said third bit vector to yield a second result Boolean value wherein said second logical "AND" operation terminates upon achieving a second successful match on a bit by bit basis;

storing said first result Boolean value and said second result Boolean value as a value limit correlation wherein said value limit correlation comprises a first index having a first dimension sized to a first number of distinct values held in said first field and a second index having a second dimension sized to a second number of distinct values held in said third field irregardless of a total data record count;

determining if at least one record in a database exists wherein said at least one record comprises both said first value in said first field and said third value in said second field by accessing said value limit correlation and without accessing said database and without accessing said first, said second or said third bit vectors;

changing said first value in said first field in a first data record to said second value;

inverting a first bit in said first bit vector to represent a false value at a first bit vector position corresponding to said first data record;

inverting a second bit in said second bit vector to represent a true value at said first bit vector position corresponding to said first data record;

setting a Boolean true value in said value limit correlation at said first index corresponding to said second value and at said second index corresponding to said third value;

performing a third logical "AND" operation on said first bit vector with said third bit vector to yield a third result Boolean value wherein said third logical "AND" operation terminates upon achieving a third successful match; and, setting a Boolean false value in said value limit correlation at said first index corresponding to said first value and at said second index corresponding to said third value if said performing said third logical "AND" operation yields a false third result Boolean value.

* * * * *